United States Patent
Hirokane et al.

(10) Patent No.: US 6,671,234 B1
(45) Date of Patent: Dec. 30, 2003

(54) MAGNETO-OPTICAL STORAGE MEDIA AND METHOD OF REPRODUCING THE SAME

(75) Inventors: Junji Hirokane, Nara (JP); Noboru Iwata, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 713 days.

(21) Appl. No.: 09/604,821

(22) Filed: Jun. 28, 2000

(30) Foreign Application Priority Data

Jun. 28, 1999 (JP) .......................................... 11-181037

(51) Int. Cl.[7] .............................................. G11B 11/00
(52) U.S. Cl. ................................ 369/13.43; 369/13.45; 369/13.46; 428/694 EC; 428/212
(58) Field of Search ........................... 369/13.49, 13.5, 369/13.51, 13.02, 13.08, 13.32, 13.07, 13.41–13.48, 275.2, 283; 428/694 ML, 694 EC, 212, 694 MM, 694 RE

(56) References Cited

U.S. PATENT DOCUMENTS

| | | | |
|---|---|---|---|
| 5,498,485 A | | 3/1996 | Nakayama et al. |
| 5,623,458 A | * | 4/1997 | Matsumoto et al. ..... 369/13.46 |
| 5,714,251 A | | 2/1998 | Ohta et al. |
| 5,738,765 A | | 4/1998 | Ohta et al. |
| 5,863,649 A | * | 1/1999 | Hirokane et al. ........... 428/332 |
| 5,939,187 A | | 8/1999 | Hirokane et al. |
| 5,955,191 A | | 9/1999 | Hirokane et al. |
| 6,187,460 B1 | * | 2/2001 | Nishimura .......... 428/694 MM |
| 6,226,234 B1 | * | 5/2001 | Ohnuki et al. ........... 369/13.46 |
| 6,430,115 B1 | * | 8/2002 | Hirokane et al. ........ 369/13.43 |
| 6,456,571 B1 | * | 9/2002 | Hirokane et al. ........ 369/13.43 |

FOREIGN PATENT DOCUMENTS

| JP | 9320134 A | 12/1997 |
|---|---|---|
| JP | 10049926 A | 2/1998 |

* cited by examiner

*Primary Examiner*—Ali Neyzari
(74) *Attorney, Agent, or Firm*—Birch, Stewart, Kolasch & Birch, LLP

(57) ABSTRACT

A magneto-optical storage medium includes: a reproduction magnetic layer exhibiting in-plane magnetization at room temperature and changing to perpendicular magnetization at a critical temperature or higher; first and second in-plane magnetized layers with Curie temperatures in a proximity of the critical temperature and exhibiting mutually opposite magnetic polarities; and a recording magnetic layer fabricated from a perpendicularly magnetized film, the reproduction magnetic layer, the first and second in-plane magnetized layers, and the recording magnetic layer being sequentially deposited, wherein the reproduction magnetic layer is exchange-coupled with the first and second in-plane magnetized layers at least at room temperature.

25 Claims, 12 Drawing Sheets

↑ TOTAL MAGNETIZATION

⇧ LEAKING MAGNETIC FLUX

F I G. 1
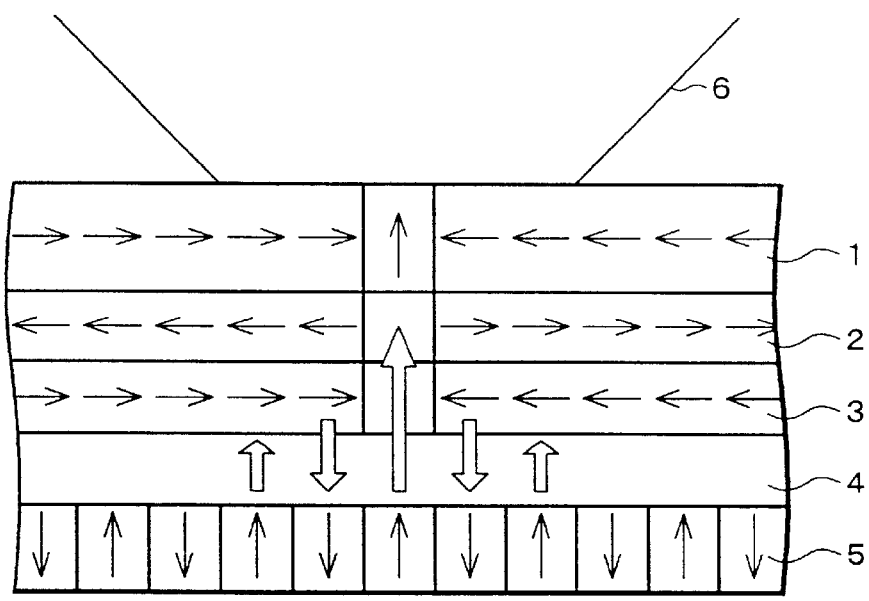
↑ TOTAL MAGNETIZATION
⇧ LEAKING MAGNETIC FLUX

LEAKING MAGNETIC FLUX

LEAKING MAGNETIC FLUX

➡ TOTAL MAGNETIZATION

→ TM MOMENT

F I G. 4
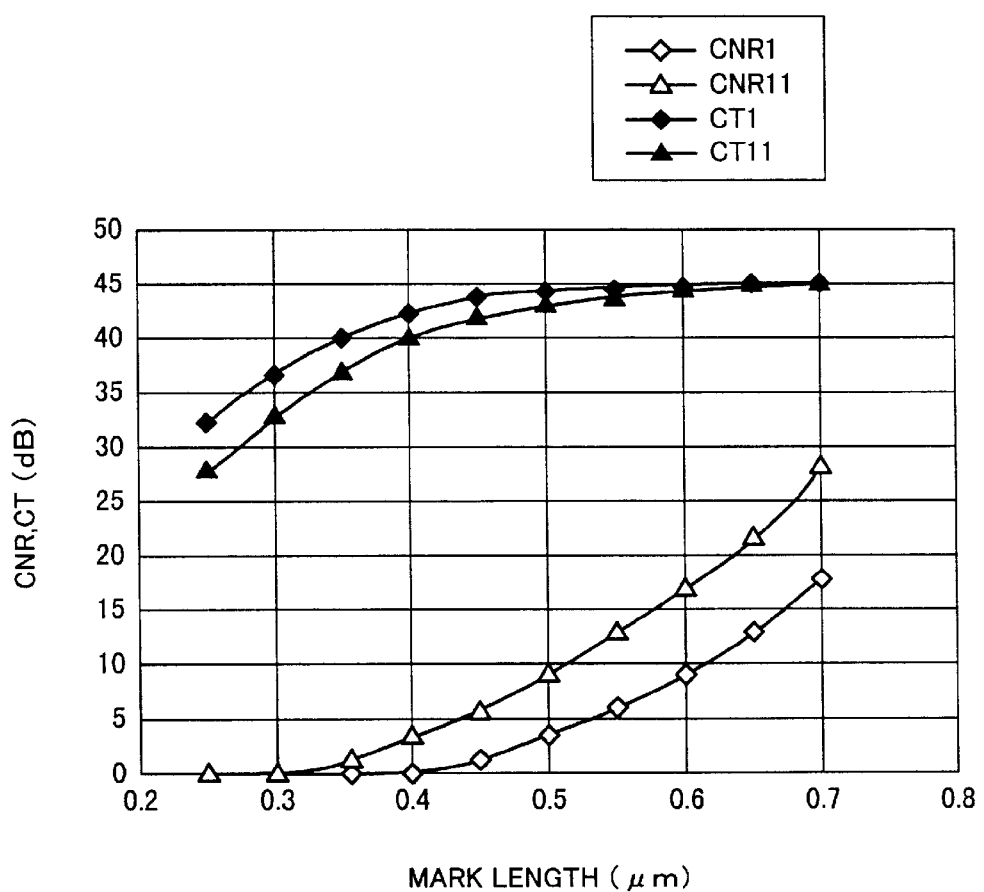

F I G. 5
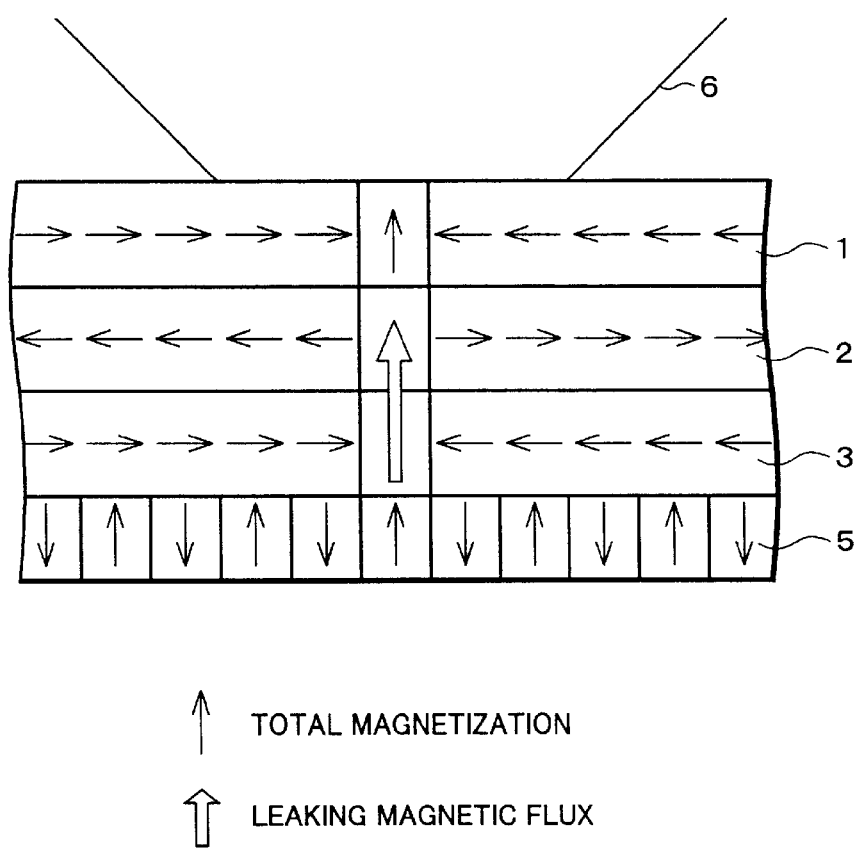

F I G. 7
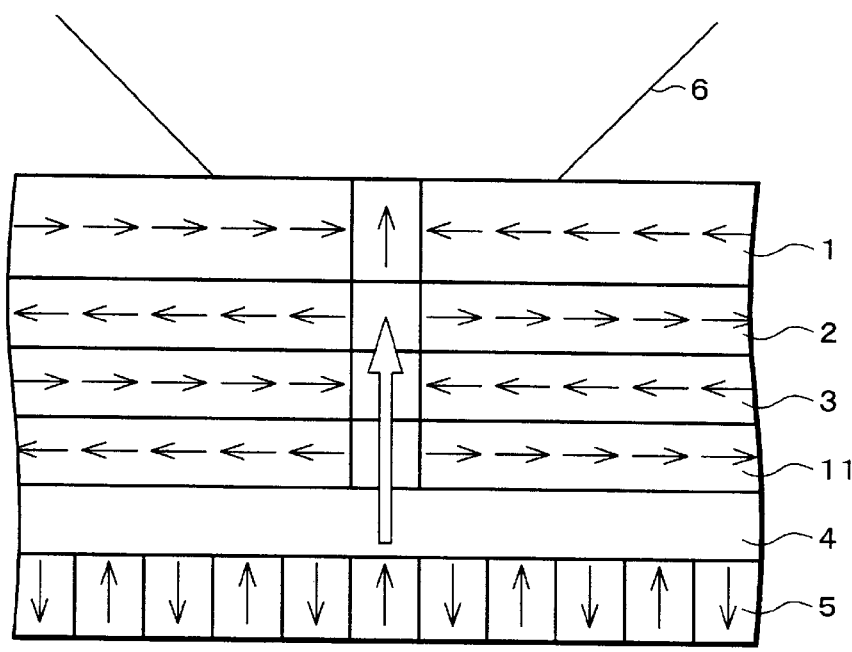
↑ TOTAL MAGNETIZATION
⇧ LEAKING MAGNETIC FLUX

↑ TOTAL MAGNETIZATION

⇧ LEAKING MAGNETIC FLUX

MAGNETO-OPTICAL STORAGE MEDIA AND METHOD OF REPRODUCING THE SAME

FIELD OF THE INVENTION

The present invention relates to magneto-optical disks, magneto-optical tapes, magneto-optical card, and other similar magneto-optical storage media for use with magneto-optical recording/reproduction devices and methods of reproducing the same.

BACKGROUND OF THE INVENTION

Conventionally, magneto-optical disks incorporating magneto-optical storage media have found commercial applications as rewritable optical storage media. The magneto-optical disk records/erases data through heating of a part of the magneto-optical storage medium by focusing a light beam emitted from a semiconductor laser device on the magneto-optical storage medium. The recorded data is reproduced by projecting a focused light beam on the magneto-optical storage medium with such intensity that causes no data erasure and then identifying the polarization of the reflected light.

Such a magneto-optical storage medium has a problem that reproduction characteristics degrade when the spot diameter of the light beam is relatively large compared with the diameter and interval of the recording bits in the magnetic domain where data is recorded. This is because the light beam, although being focused on the target recordings bit, forms a relatively large spot encompassing those recording bits immediately adjacent to the target bit, and thus fails to distinguish between the recording bits in reproduction.

Japanese Laid-Open Patent Application Nos. 9-320134/1997 (Tokukaihei 9-320134 published on Dec. 12, 1997, corresponding to U.S. Pat. No. 5,939,187) and Japanese Laid-Open Patent Application No. 10-049926/1998 (Tokukaihei 10-049926 published on Feb. 20, 1998, corresponding to U.S. Pat. No. 5,955,191) discloses magneto-optical storage Media addressing the foregoing problem. In the former patent application, the suggested magneto-optical storage medium includes: a reproduction magnetic layer exhibiting in-plane magnetization at room temperature and perpendicular magnetization at temperatures at or higher than a critical temperature; an in-plane magnetized film with a Curie temperature in the proximity of the critical temperature; a non-magnetic intermediate layer; and a recording magnetic layer constituted by a perpendicularly magnetized film where information is recorded. In the latter patent application, the suggested magneto-optical storage medium includes: a reproduction magnetic layer constituted by a perpendicularly magnetized film; an in-plane magnetized layer; a reproduction magnetic layer constituted by a perpendicularly magnetized film; another in-plane magnetized layer; and a recording magnetic layer constituted by a perpendicularly magnetized film where information is recorded.

In these magneto-optical storage media, the reproduction magnetic layer exhibits in-plane magnetization at temperatures not higher than a critical temperature or at temperatures not higher than the Curie temperature of the in-plane magnetized layer; therefore, the information recorded in a recording magnetic domain of a recording magnetic layer is not copied to the reproduction layer, rendering the information in the recording magnetic domain unreproducible. By contrast, the reproduction magnetic layer exhibits perpendicular magnetization at temperatures not lower than a critical temperature or at temperatures not lower than the Curie temperature of the in-plane magnetized layer; therefore, the information recorded in a recording magnetic domain of the recording magnetic layer is copied to the reproduction magnetic layer, allowing the information in the recording magnetic domain to be reproduced. For these reasons, individual recording bits can be distinguished from one another in reproduction, enabling the reproduction of information recorded with high density, if the reproduction power of the light beam and the critical temperature at which the reproduction magnetic layer changes to perpendicular magnetization are appropriately specified, even when the light beam focused on the reproduction magnetic layer forms a beam spot encompassing adjacent recording bits.

Nevertheless, in recent years, optical disks are required to improve their storage capacity further. Accordingly, the magneto-optical storage media disclosed in Japanese Laid-Open Patent Application No. 9-320134/1997 (Tokukaihei 9-320134) and Japanese Laid-Open Patent Application No. 10-049926/1998 (Tokukaihei 10-049926) mentioned above come short of providing sufficient masking effect of in-plane magnetization and sufficient reproduction resolution.

SUMMARY OF THE INVENTION

The present invention has an object to offer magneto-optical storage media that can improve masking effect of in-plane magnetization and also to offer a method of reproducing the same.

In order to achieve the above object, a magneto-optical storage medium in accordance with the present invention is characterized in that it includes:
 a reproduction magnetic layer exhibiting in-plane magnetization at room temperature and changing to perpendicular magnetization at a critical temperature or higher;
 a plurality of in-plane magnetized layers with Curie temperatures in a; proximity of the critical temperature and opposite magnetic polarities between every adjacent pair of the plurality of in-plane magnetized layers; and
 a recording magnetic layer fabricated from a perpendicularly magnetized film,
 the reproduction magnetic layer, the plurality of in-plane magnetized layers, and the recording magnetic layer being sequentially deposited,
 wherein the reproduction magnetic layer is exchange-coupled with the plurality of in-plane magnetized layers at least at room Temperature.

With the arrangement, the exchange coupling between the plurality of in-plane magnetized layers with opposite magnetic polarities forms an inter-surface magnetic wall; this greatly enhances ability to retain the in-plane magnetization against magnetic flux leakage. In this manner, the arrangement retains the in-plane magnetization of the reproduction magnetic layer and reinforces in-plane magnetization masking, resulting in improvement in reproduction resolution.

As in the foregoing, the present invention successfully improves masking effect of the in-plane magnetized layers and also reproduces signals with sufficient quality from recording bits of small diameters and intervals, i.e., improves reproduction resolution in magnetic super-high resolution reproduction.

In order to achieve the above object, another magneto-optical storage medium in accordance with the present invention is characterized in that it includes:
a reproduction magnetic layer exhibiting perpendicular magnetization from room temperature to a Curie temperature when used alone;
a plurality of in-plane magnetized layers with Curie temperatures lower than the Curie temperature of the reproduction magnetic layer and opposite magnetic polarities between every adjacent pair of the plurality of in-plane magnetized layers; and
a recording magnetic layer fabricated from a perpendicularly magnetized film,
the reproduction magnetic layer, the plurality of in-plane magnetized layers, and the recording magnetic layer being sequentially deposited,
wherein the Reproduction magnetic layer is exchange-coupled with the plurality of in-plane magnetized layers and thereby exhibits in-plane magnetization at least at room temperature.

With the arrangement, the exchange coupling of the reproduction magnetic layer fabricated from a perpendicularly magnetized film with the plurality of in-plane magnetized layers with Curie temperatures lower than the Curie temperature of the reproduction magnetic layer aligns the magnetization of the reproduction magnetic layer in parallel to the in-plane direction and thus causes the reproduction magnetic layer to exhibit in-plane magnetization at temperatures not higher than the Curie temperatures of the plurality of in-plane magnetized layers. Consequently, in-plane magnetization masking is provided to the reproduction magnetic layer similarly to the; above arrangement, enabling magnetic super-high resolution reproduction.

In order to achieve the above object, a method of reproducing information on a magneto-optical storage medium in accordance with the present invention is characterized in that
the magneto-optical storage medium includes:
a reproduction magnetic layer exhibiting in-plane magnetization at room temperature and changing to perpendicular magnetization at a critical temperature or higher;
a plurality of in-plane magnetized layers with Curie temperatures in a proximity of the critical temperature and opposite magnetic polarities between every adjacent pair of the plurality of in-plane magnetized layers; and
a recording magnetic layer fabricated from a perpendicularly magnetized film,
the reproduction magnetic layer, the plurality of in-plane magnetized layers, and the recording magnetic layer being sequentially deposited,
wherein the reproduction magnetic layer is exchange-coupled with the plurality of in-plane magnetized layers at least at room temperature, and also in that
the method includes a step of heating the reproduction magnetic layer and the plurality of in-plane magnetized layers to or exceeding the proximity of the critical temperature.

In order to achieve the above object, another method of reproducing information on a magneto-optical storage medium in accordance with the present invention is characterized in that
the magneto-optical storage medium includes:
a reproduction magnetic layer exhibiting perpendicular magnetization from room temperature to a Curie temperature when used alone;
a plurality of in-plane magnetized layers with Curie temperatures lower than the Curie temperature of the reproduction magnetic layer and opposite magnetic polarities between every adjacent pair of the plurality of in-plane magnetized layers; and
a recording magnetic layer fabricated from a perpendicularly magnetized film,
the reproduction magnetic layer, the plurality of in-plane magnetized layers, and the recording magnetic layer being sequentially deposited,
wherein the reproduction magnetic layer is exchange-coupled with the plurality of in-plane magnetized layers and thereby exhibits in-plane magnetization at least at room temperature, and also in that
the method includes a step of heating the reproduction magnetic layer and the plurality of in-plane magnetized layers to or exceeding the Curie temperatures of the plurality of in-plane magnetized layers.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory drawing illustrating principles in super-high resolution reproduction of a magneto-optical storage medium of an embodiment in accordance with the present invention.

FIG. 4 is an explanatory drawing schematically showing an arrangement of a magneto-optical disk, which is a comparative example for the magneto-optical storage medium in accordance with the present invention.

FIG. 5 is an explanatory drawing illustrating principles in super-high resolution reproduction of a magneto-optical storage medium of another embodiment in accordance with the present invention.

FIG. 7 is an explanatory drawing illustrating principles in super-high resolution reproduction of a magneto-optical storage medium of a further embodiment in accordance with the present invention.

DETAILED DESCRIPTION OF THE PREFERRED EMBODIMENTS

Embodiment 1

Referring to drawings, the following description will discuss an embodiment in accordance with the present invention.

Figure 12:
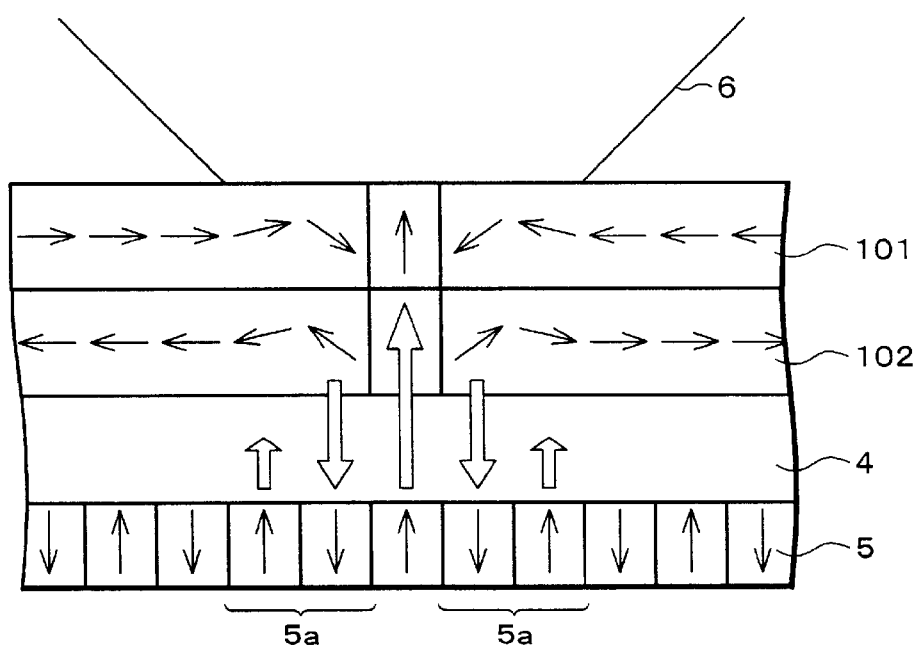
FIG. 12 is an explanatory drawing illustrating principles in super-high resolution reproduction of a conventional magneto-optical storage medium.

First, the principles in super-high resolution reproduction of the magneto-optical storage medium of the present embodiment will be discussed. FIG. 1 is an explanatory drawing illustrating principles in super-high resolution reproduction of a magneto-optical storage medium in accordance with the present invention, whereas FIG. 12 is an explanatory drawing illustrating principles in conventional super-high resolution reproduction.

First, the conventional super-high resolution reproduction will be discussed. As shown in FIG. 12, a conventional super-high resolution magneto-optical storage medium is constituted by a sequentially deposited reproduction magnetic layer 101, in-plane magnetized layer 102, non-magnetic intermediate layer 4, and recording magnetic layer 5. The reproduction magnetic layer 101 is composed of an alloy of rare earth and transition metals that exhibits in-plane magnetization at room temperature and perpendicular magnetization at temperature not lower than a critical temperature. The in-plane magnetized layer 102 exhibits in-plane magnetization from room temperature up to the Curie temperature which is in the proximity of the critical temperature. The recording magnetic layer 5 is composed of an alloy of rare earth and transition metals that has the compensation temperature in room temperature range.

Reproduction is done by projecting a focused light beam 6 on the reproduction magnetic layer 101. As the light beam 6 is projected, the medium shows a Gaussian-like temperature distribution coinciding with the intensity distribution of the light beam 6. The reproduction magnetic layer 101 changes gradually from in-plane magnetization to perpendicular magnetization according to the temperature distribution, and exhibits perpendicular magnetization at temperatures equal to, and higher than, a certain critical temperature. The in-plane magnetized layer 102 is fabricated from an in-plane magnetized film whose Curie temperature is in the proximity of the critical temperature. Therefore, at temperatures not higher than the critical temperature, the in-plane magnetized layer 102 exerts an exchange coupling force on the reproduction magnetic layer 101 by establishing exchange coupling with the reproduction magnetic layer 101, so as to force the reproduction magnetic layer 101 to change to in-plane magnetization.

This function of the in-plane magnetized layer 102 enables the reproduction magnetic layer 101 to swiftly change from in-plane magnetization to perpendicular magnetization in response to rising temperature. Thus, the magnetization of only a part of the recording magnetic layer 5 where temperature has risen due to the projection of the light beam 6 is copied to the reproduction magnetic layer 101 through electrostatic coupling, enabling the reproduction by means of the light beam 6.

Here, the recording magnetic layer 5 is adjusted in terms of composition to exhibit a total magnetization that grows with a rise in temperature with large magnetic flux leakage being produced where temperature has risen, so as to realize an optimum electrostatic coupling. Specifically, the recording magnetic layer 5 is fabricated from a perpendicularly, magnetized film with the compensation temperature in the proximity of room temperature.

The non-magnetic intermediate layer 4 is provided so as to ensure the establishment of stable electrostatic coupling across the recording magnetic layer 5, the reproduction magnetic layer 101, and the in-plane magnetized layer 102.

As detailed in the above, in the conventional arrangement, information is copied and reproduced, preferably, only at temperatures not lower than the critical temperature at which the reproduction magnetic layer 101 changes to perpendicular magnetization.

However, as shown in FIG. 12, as the magnetic flux leakage from the recording magnetic layer 5 grows stronger with temperature rise, magnetic fluxes smaller intensities also leaks out of parts Sa of the recording magnetic layer where temperature is not sufficiently high. These leaking magnetic fluxes negatively affect the reproduction magnetic layer 101 which has a relatively high Curie temperature and a great total magnetization, exerting a magnetic coupling force to align the magnetization of the reproduction magnetic layer 101 to the direction of the magnetic fluxes.

Since the in-plane magnetized layer 102 is easy to lose its in-plane magnetization in the proximity of its Curie temperature, the magnetization of the in-plane magnetized layer 102 which is exchange-coupled with the reproduction magnetic layer 101 becomes antiparallel with the magnetization of the reproduction magnetic layer 101.

In the arrangement shown in FIG. 12, it is presumed that the reproduction magnetic layer 101 is a RE-rich magnetic c layer that exhibits in-plane magnetization at room temperature and changes to perpendicular magnetization at high temperatures. The term, "RE-rich", refers to such a composition that produces a greater rare earth metal moment in a reproduction temperature range, in comparison with a compensation composition in which a balance is struck between the rare earth metal (RE) moment and the transition metal (TM) moment. It is also presumed that the in-plane magnetized layer 102 is fabricated from a TM-rich, in-plane magnetized film. Under these presumptions, the establishment of exchange coupling causes the reproduction magnetic layer 101 and the in-plane magnetized layer 102 to exhibit antiparallel total magnetization. For these reasons, at temperatures not higher than the critical temperature, the reproduction magnetic layer 101 exhibits oblique magnetization, including a perpendicular component used for reproduction; the reproduction resolution degrades inevitably.

Based on the foregoing, to improve the reproduction resolution, it is necessary to reinforce the ability of the in-plane magnetized layer 102 to stay in in-plane magnetization and thereby retain the reproduction magnetic layer 101 in complete in-plane magnetization during temperature increase. However, in the conventional arrangement shown in FIG. 12, it is difficult to reinforce the ability of the in-plane magnetized layer 102 to stay in in-plane magnetization in the proximity of the Curie temperature of the in-plane magnetized layer 102.

The present invention is conceived so as to overcome problems in the improvement of the reproduction resolution and provide an arrangement for a medium with which a higher reproduction resolution is available.

Referring to FIG. 1, the following description will discuss principles in reproduction of the super-high resolution magneto-optical storage medium of the present embodiment.

The magneto-optical storage medium of the present embodiment is constituted by a sequentially deposited reproduction magnetic layer 1, first in-plane magnetized layer 2, second in-plane magnetized layer 3, non-magnetic intermediate layer 4, and recording magnetic layer 5.

The reproduction magnetic layer 1 is a magnetic film composed of an alloy of rare earth and transition metals that exhibits in-plane magnetization at room temperature and perpendicular magnetization at temperature not lower than a critical temperature, similarly to the reproduction magnetic layer 101 in the conventional magneto-optical storage medium illustrated in FIG. 12.

The first in-plane magnetized layer 2 is composed of an alloy of rare earth and transition metals that exhibits in-plane magnetization from room temperature up to the Curie temperature which is in the proximity of the critical temperature, similarly to the in-plane magnetized layer 102 illustrated in FIG. 12.

The second in-plane magnetized layer 3 is fabricated from an in-plane magnetized film composed of an alloy of rare earth and transition metals that exhibits in-plane magnetization from room temperature up to Curie temperature which is in the proximity of the critical temperature, and differs from the first in-plane magnetized layer 2 in magnetic polarity.

The non-magnetic intermediate layer 4 and the recording magnetic layer 5 are the same as those in the conventional super-high resolution magneto-optical storage medium illustrated in FIG. 12.

In the arrangement of the magneto-optical storage medium of the present embodiment, the exchange coupling between the first and second in-plane magnetized layers 2 and 3 can greatly reinforce the ability of the first and second in-plane magnetized layers 2 and 3 to stay in in-plane magnetization, enabling a high reproduction resolution.

Now, referring through FIG. 2(*a*) to FIG. 2(*d*), the following description will discuss functions of the dual in-plane magnetized layers 2 and 3 in the magneto-optical storage medium of the present embodiment, in comparison to one in-plane magnetized layer.

FIG. 2(*a*) and FIG. 2(*b*) show the magnetization of the single in-plane magnetized layer 102, whereas FIG. 2(*c*) and FIG. 2(*d*) show the magnetization of the first and second in-plane magnetized layers 2 and 3 being exchange-coupled. Although the discussion below will be made on a presumption that the first in-plane magnetized layer 2 is TM rich and the second in-plane magnetized layer 3 is RE rich, the present invention is applicable also to other configurations for example, the TM- and RE-rich combination of the first and second in-plane magnetized layers 2 and 3 may be reversed.

The single in-plane magnetized layer 102 exhibits complete in-plane magnetization when there is no magnetic flux leaking from the recording magnetic layer 5 as shown in FIG. 2(*a*). In this situation, the in-plane magnetized layer 102, fabricated from a TM-rich, in-plane magnetized film, exhibits parallel total magnetization and TM moment. When there is magnetic flux leakage as shown in FIG. 2(*b*), the total magnetization is electrostatically coupled with the magnetic flux leakage, and acted on by a force to align the total magnetization to the magnetic flux leakage; therefore the in-plane magnetized layer 102 exhibits a total magnetization and a TM moment that are tilting with respect to the surface of the layer.

By contrast, if the first in-plane magnetized layer 2 of a TM-rich composition and the second in-plane magnetized layer 3 of a RE-rich composition are exchange-coupled, when there is no magnetic flux leakage as shown in FIG. 2(*c*), both the first and second in-plane magnetized layer s 2 and 3 exhibit complete in-plane magnetization. In this situation, the first in-plane magnetized layer 2, being fabricated from a TM-rich, in-plane magnetized film, exhibits parallel total magnetization and TM moment. The second in-plane magnetized layer 3, being fabricated from a RE-rich, in-plane magnetized film, exhibits antiparallel total magnetization and TM moment.

When there is magnetic flux leakage as shown in FIG. 2(*d*), the total magnetization of the first and second in-plane magnetized layers 2 and 3 is electrostatically coupled with the magnetic flux leakage, and acted on by a force to align the total magnetization to the magnetic flux leakage. Since the first in-plane magnetized layer 2 has a different magnetic polarity from the second in-plane magnetized layer 3, the first in-plane magnetized layer 2 will have an upward tilting TM moment, whereas the second in-plane magnetized layer 3 will have a downward tilting TM moment. In this situation, an inter-surface magnetic wall is formed between the first and second in-plane magnetized layers 2 and 3, where magnetic wall energy is stored. In this situation, since the magnetization is such that the sum of the electrostatic coupling energy and the magnetic wall energy is minimum, the storage of magnetic wall energy allows the total magnetization and TM moment to be tilted only to a relatively small extent when compared with the single in-plane magnetized layer 102.

To sum of the discussion in the foregoing, the in-plane magnetization can be far better retained against magnetic flux leakage as a result of the inter-surface magnetic wall formed by the exchange coupling of the dual in-plane magnetized layers with different magnetic properties.

On top of the foregoing arrangement of the present embodiment, if the reproduction magnetic layer 1 and the first in-plane magnetized layer 2 have opposite magnetic polarities, the reproduction magnetic layer 1 and the first in-plane magnetized layer 2 will have enhanced ability to stay in in-plane magnetization in a low temperature range, similarly to the first and second in-plane magnetized layers 2 and 3.

EXAMPLE 1

Referring to drawings, the following description will discuss an application example of a magneto-optical storage medium in accordance with the present invention to a magneto-optical disk.

Figure 2A:
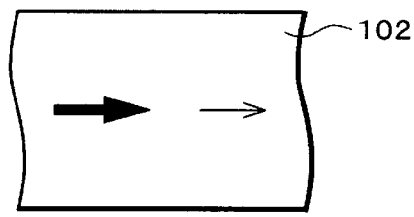
FIG. 2(a) through FIG. 2(d) are explanatory drawings illustrating effects of the in-plane magnetized layer in the magneto-optical storage medium of the foregoing embodiment.
Figure 2B:
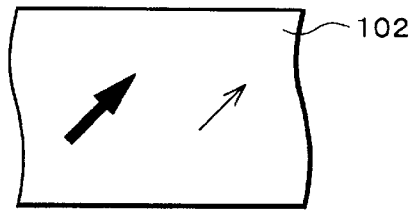
Figure 2C:
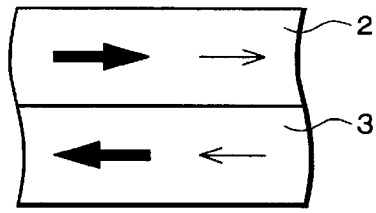
Figure 2D:
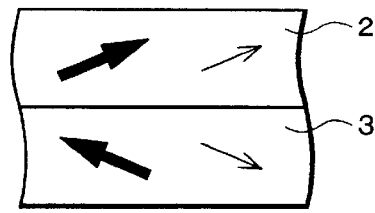
Figure 3:
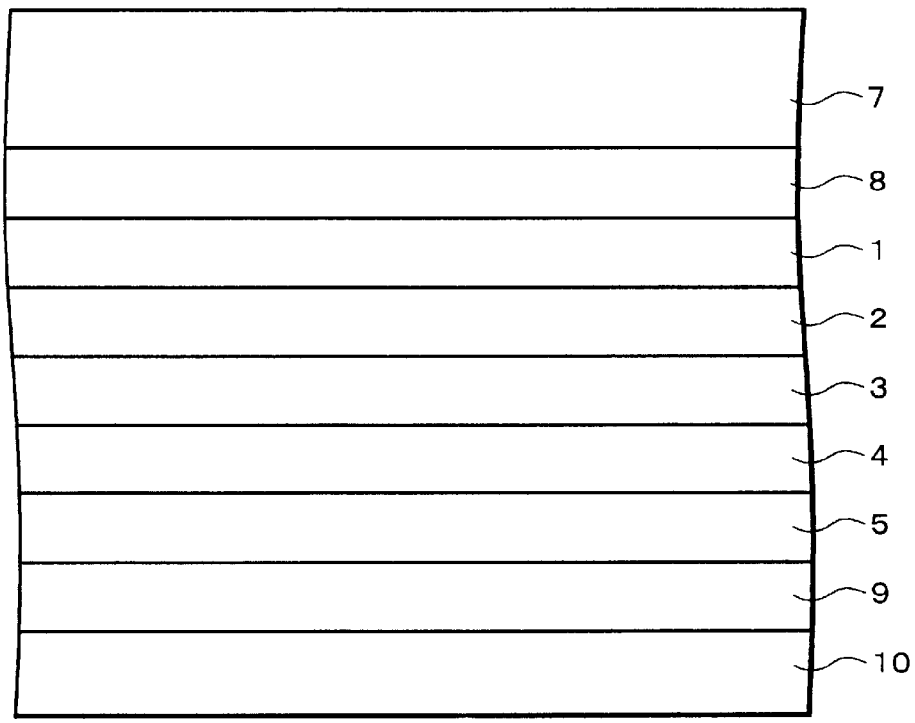
FIG. 3 is an explanatory drawing schematically showing an arrangement of a magneto-optical disk, which is an application example of the magneto-optical storage medium in accordance with the present invention.

The magneto-optical disk of the present example, as shown in FIG. 3, contains a disk main body constituted by a sequentially deposited substrate 7, transparent dielectric layer 8, reproduction magnetic layer 1, first in-plane magnetized layer 2, second in-plane magnetized layer 3, non-magnetic intermediate layer 4, recording magnetic layer 5, protection layer 9, and overcoat layer 10.

The magneto optical disk employs, as its recording scheme, the Curie temperature recording scheme whereby a light beam 6 emitted from a semiconductor laser device is focused at the reproduction magnetic layer 1 by an objective lens to enable information to be recorded and reproduced by a magneto-optical effect known as polar Kerr effect. Polar Kerr effect is such a phenomenon that the rotational direction of the polarization plane of polarized light reverses upon reflection due to magnetization perpendicular to the light-entering surface.

The substrate 7 is formed of polycarbonate or other transparent materials in a disk shape, for example.

Preferably, the transparent dielectric layer 8 is composed of AlN, SiN, AlSiN, or other materials that contain no oxygen, and has such a thickness that enables an incident laser to produce a good interfering effect and the Kerr rotation angle of the medium to increase. The thickness of the transparent dielectric layer 8 is set to about λ/4n, where λ represents the wavelength of the laser for use in reproduction, and n represents the refractive index of the transparent dielectric layer 8. When the wavelength of the laser is 680 nm for example, the thickness of the transparent dielectric layer 8 should be about 40 nm to 100 nm.

The reproduction magnetic layer 1 is fabricated from a magnetic film composed of an alloy of rare earth and transition metals, and has a composition adjusted so as to exhibit in-plane magnetization at room temperature and change to perpendicular magnetization as temperature rises exceeding a predetermined critical temperature.

The reproduction magnetic layer 1 preferably has a critical temperature not lower than 100° C. and not higher than 200° C. If the critical temperature is below 100° C., even a relatively small increase in temperature causes the reproduction magnetic layer 1 to change to perpendicular magnetization. This renders the reproduction magnetic layer 1 to sensitive to ambient temperature changes to perform stable reproduction. By contrast, if the critical temperature exceeds 200° C., it becomes difficult to ensure a reproduction laser power margin due to the small difference between the critical temperature of the reproduction magnetic layer 1 and the Curie temperature of the recording magnetic layer 5.

The reproduction magnetic layer 1 preferably has a thickness not lower than 10 nm and not higher than 50 nm. Cutting down on the thickness of the reproduction magnetic layer 1 allows a higher reproduction resolution; a less-than-10 nm-thick reproduction magnetic layer 1, however, cannot sufficiently reflect incident light and reduces the intensity of reproduction signals. By contrast, if the reproduction magnetic layer 1 is thicker than 50 nm, the reproduction magnetic layer 1 is too thick in comparison with the first and second in-plane magnetized layers 2 and 3, and results in a reduced reproduction resolution.

The first in-plane magnetized layer 2 is fabricated from a magnetic film composed of an alloy of rare earth and transition metals or an alloy of a transition metal and a non-magnetic element, and exhibits magnetization parallel to its surface. As described earlier, the first in-plane magnetized layer 2 is provided so as to retain the in-plane magnetization of the reproduction magnetic layer 1 and reinforce the in-plane magnetization masking through its exchange coupling with the reproduction magnetic layer 1 at temperatures not higher than the foregoing critical temperature.

The first in-plane magnetized layer 2 preferably has the Curie temperature in the proximity of the critical temperature of the reproduction magnetic layer 1, specifically, within ±30° C. of the critical temperature.

The first in-plane magnetized layer 2 preferably has a thickness not lower than 3 nm. If the first in-plane magnetized layer 2 is thinner than 3 nm, the first in-plane magnetized layer 2 is too thin in comparison with the reproduction magnetic layer 1, which hampers the ability of the reproduction magnetic layer 1 to reinforce in-plane magnetization masking and results in a lower reproduction resolution.

The second in-plane magnetized layer 3 is fabricated from an in-plane magnetized film composed of an alloy of rare earth and transition metals with a different magnetic polarity from that of the first in-plane magnetized layer 2, and exhibits magnetization parallel to its surface. As described earlier, the second in-plane magnetized layer 3 is provided so as to retain the in-plane magnetization of the reproduction magnetic layer 1 and reinforce the in-plane magnetization masking through its exchange coupling with the first in-plane magnetized layer 2 at temperatures not higher than the foregoing critical temperature.

Similarly to the first in-plane magnetized layer 2, the second in-plane magnetized layer 3 preferably has the Curie temperature in the proximity of the critical temperature of the reproduction magnetic layer 1, specifically, within ±30° C. of the critical temperature.

The second in-plane magnetized layer 3, preferably, is as thick as the first in-plane magnetized layer. By setting the thickness of the first in-plane magnetized layer 2 substantially equal to that of the second in-plane magnetized layer 3, the recording magnetic layer 5 exerts substantially equal electrostatic coupling forces on the first and second in-plane magnetized layers 2 and 3. This results in higher efficiency in forming an inter-surface magnetic wall and stably reinforces the in-plane magnetization of the first and second in-plane magnetized layers 2 and 3.

The non-magnetic intermediate layer 4 is composed of a dielectric, such as AlN, SiN, or AlSiN, or an alloy of Al, Ti, Ta, and other non-magnetic metals. The thickness of the non-magnetic intermediate layer 4 is set in a range of not less than 0.5 nm to not more than 40 nm so as to enable the recording magnetic layer 5 to be electrostatically coupled with the reproduction magnetic layer 1, the first in-plane magnetized layer 2, and the second in-plane magnetized layer 3. An attempt to form a uniform, less-than-0.5 nm-thick non-magnetic intermediate layer 4 is highly likely to fail; the result would be a discontinuous non-magnetic intermediate layer 4 which cannot maintain stable electrostatic coupling. By contrast, if the non-magnetic intermediate layer 4 is thicker than 40 nm, the recording magnetic layer 5 is separated from the second in-plane magnetized layer 3 by the increased thickness, which makes it impossible to maintain stable electrostatic coupling.

The first in-plane magnetized layer 2, the second in-plane magnetized layer 3, and the non-magnetic intermediate layer 4 preferably is 60 nm or less when combined. If the combined thickness exceeds 60 nm, the reproduction magnetic layer 1 is separated too far apart from the recording magnetic layer 5, which lessens the electrostatic coupling force acting between the two layers and hampers stable reproduction.

The recording magnetic layer 5 is fabricated from a perpendicularly magnetized film composed of an alloy of rare earth and transition metals that has the compensation temperature in the proximity of room temperature, and is has a thickness in a range of not less than 20 nm and not more than 80 nm. If the recording magnetic layer 5 is thinner than 20 nm, there is only a small magnetic flux leaking from the recording magnetic layer 5, failing to preserve stable electrostatic coupling. By contrast, if the recording magnetic layer 5 is thicker than 80 nm, the degradation in recording sensitivity due to the increased thickness becomes intolerable.

The protection layer 9 is composed of a dielectric, such as AlN, SiN, or AlSiN, or an alloy of Al, Ti, Ta, and other non-magnetic metals. The protection layer 9 is provided so as to prevent the oxidation of the alloys of rare earth and transition metals used for the reproduction magnetic layer 1, the first in-plane magnetized layer 2, the second in-plane magnetized layer 3, and the recording magnetic layer 5. The protection layer 9 has a thickness in a range of 5 nm to 60 nm. The overcoat layer 10 is formed by applying an ultraviolet ray or heat hardening resin to the protection layer 9 using a spin coating technique, followed by either projection of an ultraviolet ray or heating.

The following description will discuss a method of manufacturing a magneto-optical disk having this arrangement and recording and reproduction characteristics by means of specific examples.

(1) Method of Manufacturing Magneto-optical Disks

A method of manufacturing a magneto-optical disk with the aforementioned arrangement will be explained in the following.

First, a disk-shaped, polycarbonate substrate 7 with spiral, 0.6 µm-wide land and groove recording regions in which data could be stored and reproduced was placed on a substrate holder in a sputtering device that contained an Al target, a GdFeCo alloy target, a first GdFe alloy target, a second GdFe alloy target, and a TbFeCo alloy target. Subsequently to the placement, the sputtering device was evacuated to $1 \times 10^{-6}$ Torr, followed by introduction of a mixed gas of argon and nitrogen. Electrical power was then supplied to the Al target to form a 60 nm-thick, AlN transparent dielectric layer 8 on the substrate 7 at a gas pressure of $4 \times 10^{-3}$ Torr.

Next, the sputtering device was evacuated again to $1 \times 10^{-6}$ Torr, followed by introduction of argon. Electrical power was supplied to the GdFeCo alloy target, and the gas pressure was adjusted to $4 \times 10^{-3}$ Torr, so as to form a 25 nm-thick $Gd_{0.31}(Fe_{0.80}CO_{0.20})_{0.69}$ reproduction magnetic layer 1 on the transparent dielectric layer 8. The resulting reproduction magnetic layer 1 exhibited in-plane magnetization at room temperature and changed to perpendicular magnetization at 150° C. Its compensation temperature was 300° C. (so, it was RE rich at least from room temperature up to a reproduction temperature), and its Curie temperature was 320° C.

Subsequently, electrical power was supplied to the first GdFe alloy target, the gas pressure was adjusted to $4 \times 10^{-3}$ Torr, so as to form a 15 nm-thick, $Gd_{0.12}Fe_{0.88}$ (TM rich) first in-plane magnetized layer 2 on the reproduction magnetic layer 1. The resulting first in-plane magnetized, layer 2, having the Curie temperature of 150° C., was an in-plane magnetized layer exhibiting magnetization parallel to its surface from room temperature up to the Curie temperature (150° C.).

Electrical power was then supplied to the second GdFe alloy target, and the gas pressure was adjusted to $4 \times 10^{-3}$ Torr, so as to form a 15 nm-thick, $Gd_{0.46}Dy_{0.54}$ (RE rich) second in-plane magnetized layer 3 on the first in-plane magnetized layer 2. The resulting second in-plane magnetized layer 3, having the Curie temperature of 150° C., was an in-plane magnetized film exhibiting magnetization parallel to its surface from room temperature up to the Curie temperature (150° C.).

Thereafter, a mixed gas of argon and nitrogen was introduced, and electrical power was supplied to the Al target to form a 2 nm-thick, AlN non-magnetic intermediate layer 4 on the second in-plane magnetized layer 3 at a gas pressure of $4 \times 10^{-3}$ Torr.

The sputtering device is again evacuated to $1 \times 10^{-6}$ Torr, followed by introduction of gaseous argon. Electrical power was supplied to the TbFeCo alloy target, and the gas pressure was adjusted to $4 \times 10^{-3}$ Torr, so as to form a 50 nm-thick, $Tb_{0.23}(Dy_{0.80}CO_{0.20})_{0.77}$ recording magnetic layer 5 on the non-magnetic intermediate layer 4. The resulting recording magnetic layer 5 had the compensation temperature of 25° C., and its Curie temperature was 275° C.

Then, a mixed gas of argon and nitrogen was introduced, and electrical power was supplied to the Al target to form 20 nm-thick, AlN protection layer 9 on the recording magnetic layer 5 at a gas pressure of $4 \times 10^{-3}$ Torr.

Finally, ultraviolet ray hardening resin was applied onto the protection layer 9 by a spin coating technique, and ultraviolet rays were projected to form an overcoat layer 10.

(2) Recording and Reproduction Characteristics

The magneto optical disk manufactured as in the foregoing was evaluated. Information was, first, recorded by magnetic field modulation, using an evaluator equipped with an optical pickup for a semiconductor laser of a wavelength of 680 nm. The evaluation was done by means of measurements, in relation to mark lengths, of CNRs (Carrier-to-Noise Ratio) in land recording regions (see CNR1 in the graph constituting FIG. 4) and also by means of measurements, in relation to corresponding mark lengths, of crosstalk which appeared in land recording regions when information was recorded in two adjacent groove recording regions (see CT1 in the graph constituting FIG. 4).

For purpose of comparison, FIG. 4 also shows measurements of mark-length-dependent CNRs (CNR11) and crosstalk (CT11) of a magneto-optical disk, as comparative example 1, which includes no second in-plane magnetized layer 3 and a 30 nm-thick first in-plane magnetized layer 2.

The CNRs plotted here in relation to a mark length represent carrier-to-noise ratios from a train of recording magnetic domains formed such that each recording magnetic domain has a length corresponding to the mark length and spaced from previous and subsequent recording magnetic domains by intervals twice the mark length.

At a mark length of 0.3 µm, the CNR1 and CNR11 read 36 dB and 33 dB respectively, meaning that embodiment 1 has a larger CNR than comparative example 1. At a mark length of 0.7 µm, the CT1 and CT11 read 18 dB and 28 dB respectively, meaning that embodiment 1 has a smaller CT comparative example 1.

In comparative example 1 (CNR11), only one in-plane magnetized layer is disposed which is not sufficient in providing satisfactory ability to keep the in-plane magnetized layer in in-plane magnetization and thereby satisfactory in-plane magnetization masking to the reproduction magnetic layer. The insufficient in-plane magnetization in the reproduction magnetic layer results in a reduced reproduction resolution. Hence, the CNR decreases greatly at short mark lengths. By contrast, in example 1, the ability is reinforced to keep the first and second in-plane magnetized layers 2 and 3 with different polarities in in-plane magnetization. Thus, the in-plane magnetization masking in the reproduction magnetic layer is reinforced, which in our opinion lead to reproduction with higher resolution and CNRs at short mark lengths. Similarly, also in our opinion, the improvement in reproduction resolution reduced CTs at long mark lengths.

The description so far is based on a presumption that the reproduction magnetic layer 1 is composed of GdFeCo, and the first and second in-plane magnetized layers 2 and 3 are composed of GdFe. However, the present invention is not limited only to this; any alternative magnetic materials may be used as long as they impart required magnetic properties. Apart from GdFeCo, the reproduction magnetic layer 1 may be made from NdGdFeCo, GdTbFeCo, GdDyFeCo, and other magnetic alloys of rare earth and transition metals. The first in-plane magnetized layer 2 may be an in-plane magnetized film composed of GdFeCo, NdFeCo, NdGdFeCo, and other alloys of rare earth and transition metals with or without an additional non-magnetic metal that reduces the Curie temperature of the rare-earth-and-transition-metal alloy. The second in-plane magnetized layer 3 may be an in-plane magnetized film composed of GdFeCo, NdGdFeCo, and other alloys of rare earth and transition metals with a different magnetic polarity from that of the first in-plane magnetized layer, with or without an additional non-magnetic metal that reduces the Curie temperature of the rare-earth-and-transition-metal alloy.

Embodiment 2

Referring to drawings, the following description will discuss another embodiment in accordance with the present invention. Here, for convenience, members of the present embodiment that have the same arrangement and function as members of embodiment 1, and that are mentioned in embodiment 1 are indicated by the same reference numerals and description thereof is omitted.

FIG. 5 is an explanatory drawing illustrating principles in super-high resolution reproduction of a magneto-optical storage medium of the present embodiment.

As shown in FIG. 5, the magneto-optical storage medium of the present embodiment is constituted by a sequentially deposited reproduction magnetic layer 1, first in-plane magnetized layer 2, second in-plane magnetized layer 3, and recording magnetic layer 5. Accordingly, the magneto-optical storage medium of the present embodiment includes an identical arrangement to that of the magneto-optical storage medium of embodiment 1, minus the non-magnetic intermediate layer 4. In the present embodiment, the reproduction magnetic layer 1 and the first and second in-plane magnetized layers 2 and 3 are magnetic layers identical to those used in embodiment 1. So, magnetic super-high resolution reproduction is available with the present embodiment based substantially on the same principles as in embodiment 1. However, since the present embodiment includes no non-magnetic intermediate layer 4, exchange coupling force acting between the recording magnetic layer 5 and the second in-plane magnetized layer 3 acts on the second in-plane magnetized layer 3 change it to perpendicular magnetization. Accordingly, the second in-plane magnetized layer 3 is preferably formed thicker than in the arrangement of embodiment 1.

EXAMPLE 2

Referring to drawings, the following description will discuss an application example of a super-high resolution magneto-optical storage medium in accordance with the present invention to a magneto-optical disk.

Figure 6:
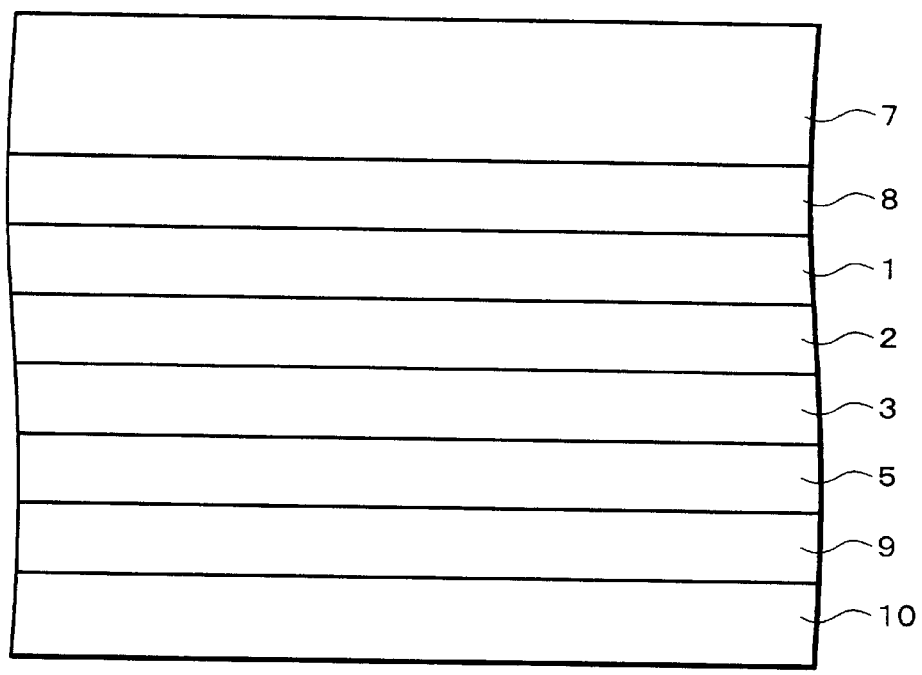
FIG. 6 is an explanatory drawing schematically showing an arrangement of a magneto-optical disk, which is an application example of the magneto-optical storage medium of the foregoing embodiment.

As shown in FIG. 6, the magneto-optical disk of the present example is constituted by a substrate 7 and a sequentially deposited reproduction transparent dielectric layer 8, reproduction magnetic layer 1, first in-plane magnetized layer 2, second in-plane magnetized layer 3, recording magnetic layer 5, protection layer 9, and overcoat layer 10.

Now, the following description will discuss a method of manufacturing, a magneto-optical disk having this arrangement and recording and reproduction characteristics.

(1) Method of Manufacturing Magneto-optical Disks

The magneto-optical disk of the present example was fabricated by the same method as the method of manufacturing magneto-optical disks discussed in example 1 in the foregoing, by sequentially forming, on the substrate 7, a 60 nm-thick, AlN transparent dielectric layer 8, a 25 nm-thick, $Gd_{0.31}(Fe_{0.80}CO_{0.20})_{0.69}$ reproduction magnetic layer 1 which is RE rich in the proximity of a reproduction temperature, a 15 nm-thick, $Gd_{0.12}Fe_{0.88}$ (TM rich) first in-plane magnetized layer 2, a 35 nm-thick, $Gd_{0.46}Fe_{0.54}$ (RE rich) second in-plane magnetized layer 3, a 50 nm-thick, $Tb_{0.23}(Fe_{0.80}CO_{0.20})_{0.77}$ recording magnetic layer 5, a 20 nm-thick, AlN protection layer 9, and an overcoat layer 10.

A magneto-optical disk was separately prepared as comparative example 2 according to the identical arrangement as the present example, except that the comparative disk includes a 50 nm-thick first in-plane magnetized layer 2 but no second in-plane magnetized layer 3.

(2) Recording and Reproduction Characteristics

The CNR of the magneto-optical disk of the present example at a mark length of 0.3 μm was measured in the same manner as in example 1. Results were such that the CNR was 36 dB in example 1 and a close value of 35.5 dB in the present example, meaning that the present example imparted reproduction characteristics that do not significantly differ from those of example 1. By contrast, the CNR was as small as 32 dB in comparative example 2 which lacked a second in-plane magnetized layer. Comparison with this comparative example 2 reveals that the reproduction resolution has successfully improved by the arrangement of the present example in which there is provided a second in-plane magnetized layer.

Subsequently, similar measurement was done on the magneto-optical disk of the present example, but with the thickness of the second in-plane magnetized layer 3 being varied. Results were such that the CNR was 35 dB at a mark length of 0.3 μm when the second in-plane magnetized layer 3 was 20 nm thick, which was substantially identical value to the CNR in example 2. When the thickness of the second in-plane magnetized layer 3 was changed to 15 nm, the CNR at a mark length of 0.3 μm significantly decreased to 29 dB. This is because the exchange coupling force exerted by the recording magnetic layer 5 on the second in-plane magnetized layer 3 copied perpendicular magnetization onto the second in-plane magnetized layer 3, and thereby lessened in-plane magnetization masking in the reproduction layer 1. Therefore, in the present example, the second in-plane magnetized layer 3 is preferably at least 20 nm thick.

The first and second in-plane magnetized layers 2 and 3 are preferably 60 nm thick or less when combined. If the combined thickness exceeds 60 nm, the reproduction magnetic layer 1 is separated too far apart from the recording magnetic layer 5, and fails to provide the recording magnetic layer 5 with sufficiently strong electrostatic coupling, which hampers stable reproduction.

In embodiment 2, the first and second in-plane magnetized layers 2 and 3 again only need to have opposite magnetic polarities The arrangement of example 2 in which the first in-plane magnetized layer 2 is TM rich and the second in-plane magnetized layer 3 is RE rich is not essential. However, when the reproduction magnetic layer 1 is RE rich in the proximity of the reproduction temperature, as mentioned earlier, preferably, the first in-plane magnetized layer 2 is TM rich and the second in-plane magnetized layer 3 is RE rich.

Embodiment 3

Referring to drawings, the following description will discuss still another embodiment in accordance with the present invention. Here, for convenience, members of the present embodiment that have the same arrangement and function as members of embodiment 1, and that are mentioned in embodiment 1 are indicated by the same reference numerals and description thereof is omitted.

FIG. 7 is an explanatory drawing illustrating principles in super-high resolution reproduction of a magneto-optical storage medium of the present embodiment. The magneto-optical storage medium of the present embodiment is constituted by a sequentially deposited reproduction magnetic layer 1, first in-plane magnetized layer 2, second in-plane magnetized layer 3, third in-plane magnetized layer 11, non-magnetic intermediate layer 4, and recording magnetic layer 5.

The magneto-optical storage medium of the present embodiment, as described in the foregoing, includes the third in-plane magnetized layer 11 as well as the arrangement of embodiment 1. In the present embodiment, the reproduction magnetic layer 1, the first in-plane magnetized layer 2, the second in-plane magnetized layer 3, the non-magnetic intermediate layer 4, and the recording magnetic layer 5 are all magnetic layers identical to those used in embodiment 1. So, magnetic super-high resolution reproduction is available with the present embodiment based substantially on the same principles as in embodiment 1.

As shown in FIG. 7, by depositing, on the second in-plane magnetized layer 3, the third in-plane magnetized layer 11 which has a different polarity from that of the second in-plane magnetized layer 3, more inter-surface magnetic walls are built between the two in-plane magnetized layers, providing better protection to the in-plane magnetized layers from changing to perpendicular magnetization. Hence, the in-plane magnetization masking in the reproduction magnetic layer is enhanced, which contributes to further increase the reproduction resolution in a magneto-optical storage medium.

EXAMPLE 3

The following description will discuss an application example of the magneto-optical storage medium of the present embodiment to a magneto-optical disk.

Figure 8:
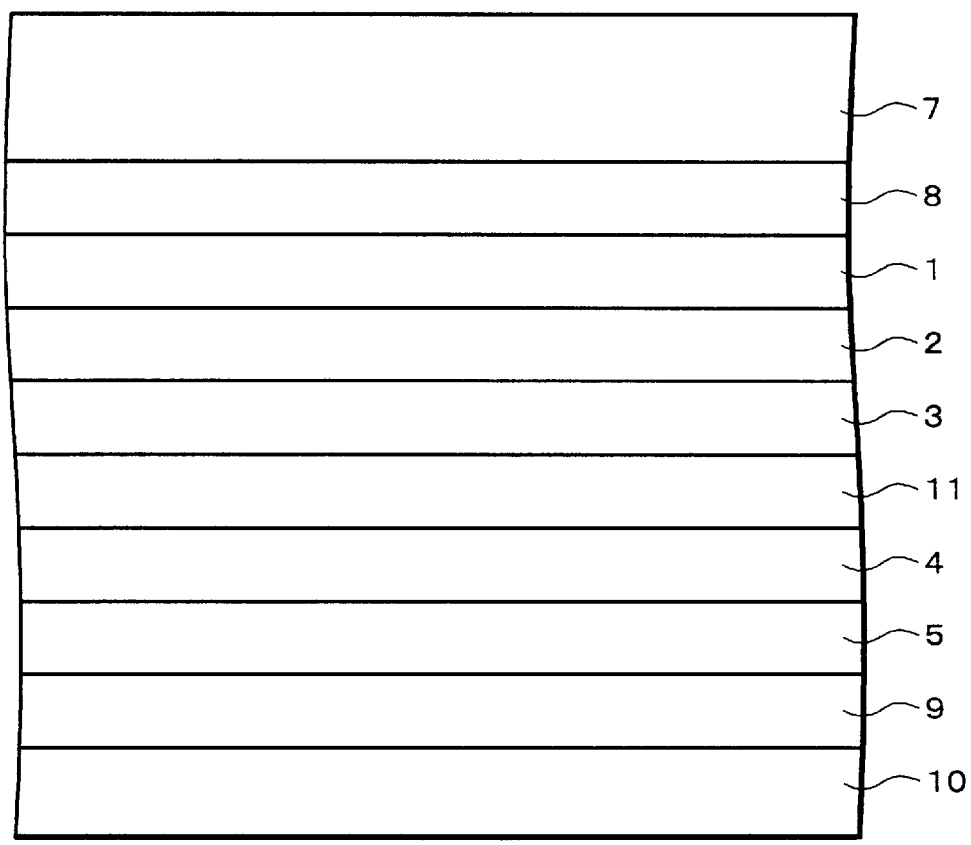
FIG. 8 is an explanatory drawing schematically showing an arrangement of a magneto-optical disk, which is an application example of the magneto-optical storage medium of the foregoing embodiment.

As shown in FIG. 8, the magneto-optical disk of the present example is constituted by a substrate 7 and a sequentially deposited transparent dielectric layer 8, reproduction magnetic layer 1, first in-plane magnetized layer 2, second in-plane magnetized layer 3, third in-plane magnetized layer 11, non-magnetic intermediate layer 4, recording magnetic layer 5, protection layer 9, and overcoat layer 10.

Now, the following description will discuss a method of manufacturing a magneto-optical disk having this arrangement and recording and reproduction characteristics.

(1) Method of Manufacturing Magneto-optical Disks

The magneto-optical disk of the present example was fabricated by the same method as the method of manufacturing magneto-optical disks discussed in example 1 in the foregoing, by sequentially forming, on the substrate 7, a 60 nm-thick, AlN transparent dielectric layer 8, a 25 nm-thick, $Gd_{0.31}$ $(Fe_{0.80}CO_{0.20})_{0.69}$ reproduction magnetic layer 1 which has a RE-rich composition in the proximity of a reproduction temperature, a 10 nm-thick, $Gd_{0.12}Fe_{0.88}$ (TM rich) first in-plane magnetized layer 2, a 10 nm-thick, $Gd_{0.46}Fe_{0.54}$ (RE rich) second in-plane magnetized layer 3, a 10 nm-thick, $Gd0.12Fe0.88$ (TM rich) third in-plane magnetized layer 11, a 2 nm-thick, AlN non-magnetic intermediate layer 4, a 50 nm-thick, $Tb_{0.23}$ $(Fe_{0.80}CO_{0.20})_{0.77}$ recording magnetic layer 5, a 20 nm-thick, AlN protection layer 9, and an overcoat layer 10.

(2) Recording and Reproduction Characteristics

The CNR of the magneto-optical disk of the present example at a mark length of 0.3 μm was measured in the same manner as in example 1. Results were such that the CNR was 36 dB in example 1 and a close value of 37.5 dB in the present example, meaning that the present example imparted better reproduction characteristics than example 1.

In the arrangement of the present example, similarly to that in example 1, the first in-plane magnetized layer 2, the second in-plane magnetized layer 3, the third in-plane magnetized layer 11, and the non-magnetic intermediate layer 4 are preferably 60 nm thick or less. If the combined thickness exceeds 60 nm, the reproduction magnetic layer 1 is separated too far apart from the recording magnetic layer 5, and fails to provide the recording magnetic layer 5 with sufficiently strong electrostatic coupling, which hampers stable reproduction, which lessens the electrostatic coupling force acting between the two layers and hampers stable reproduction.

In the present embodiment, the first to third in-plane magnetized layers 2, 3, and 11 again only need to exhibit opposite magnetic polarities between every adjacent pair of the layers 2, 3, and 11, and may be arranged differently from example 3. However, when the reproduction magnetic layer 1 is RE rich in the proximity of the reproduction temperature, as mentioned earlier, the first to third in-plane magnetized layers 2, 3, and 11 preferably have TM-rich, RE-rich, and TM-rich compositions respectively.

In the present embodiment, the description has referred so far only to three in-plane magnetized layers stacked on one another. However, the present invention is not necessarily limited by the three-tiered structure, and may be structured in four or more tiers.

In embodiments 1 to 3, the reproduction magnetic layer 1 has been a magnetic layer exhibiting in-plane magnetization at room temperature and, as temperature rises, changes to perpendicular magnetization, even if the layer 1 is used alone. Under this condition, the reproduction magnetic layer 1 may be either RE rich or TM rich in the proximity of the reproduction temperature; however, it preferably is RE rich with a high compensation temperature (alternatively, no compensation temperature exists below the Curie temperature) in the arrangement in accordance with the present invention in which the magnetization of the recording magnetic layer 5 is copied to the reproduction magnetic layer 1 through electrostatic coupling.

Embodiment 4

Referring to drawings, the following description will discuss a further embodiment in accordance with the present invention. Here, for convenience, members of the present embodiment that have the same arrangement and function as members of embodiment 1, and that are mentioned in embodiment 1 are indicated by the same reference numerals and description thereof is omitted.

Figure 9:
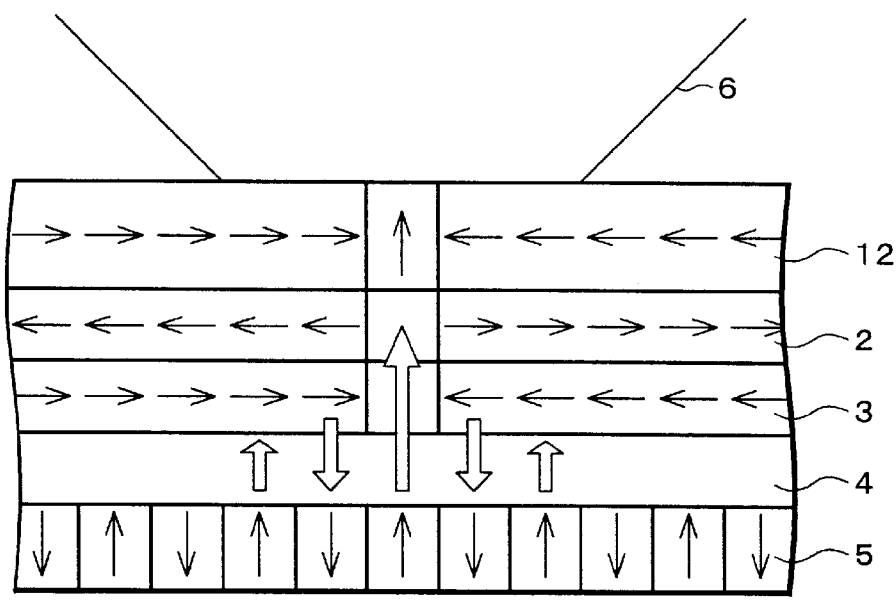
FIG. 9 is an explanatory drawing illustrating principles in super-high resolution reproduction of a magneto-optical storage medium of still another embodiment in accordance with the present invention.

FIG. 9 is an explanatory drawing illustrating principles in super-high resolution reproduction of a magneto-optical storage medium of the present embodiment in accordance with the present invention. As shown in FIG. 9, the magneto-optical storage medium of the present embodiment is constituted by a sequentially deposited reproduction magnetic layer 12, first in-plane magnetized layer 2, second in-plane magnetized layer 3, non-magnetic intermediate layer 4, and recording magnetic layer 5.

In embodiments 1 to 3, the reproduction magnetic layer 1 was a magnetic thin film composed of an alloy of rare earth and transition metals exhibiting in-plane magnetization at room temperature and perpendicular magnetization at critical temperature or higher, and could perform magnetic super-high resolution reproduction. The reproduction magnetic layer 1 was preferably a thin film composed of an alloy of rare earth and transition metals with a RE-rich composition in a reproduction temperature range. Further, the recording magnetic layer 5 preferably exhibited total magnetization that increases with a rise in temperature and reaches a peak value in a reproduction temperature range, that is, was a magnetic thin film composed of a TM-rich alloy of rare earth and transition metals with the compensation temperature in room temperature range.

Under these conditions, the TM moment copied to a target magnetic domain in the reproduction magnetic layer 1 is antiparallel to the TM moment in the corresponding source magnetic domain in the recording magnetic layer 5 due to the electrostatic coupling between the TM-rich recording magnetic layer 5 and the RE-rich reproduction magnetic layer 1. Therefore, it was a problem that those magneto-optical disks of embodiments 1 to 3 had an opposite reproduction polarity from that of a conventional magneto-optical disk.

In order to address the problem, in the present embodiment, the reproduction magnetic layer 12 is a magnetic thin film composed of an alloy of rare earth and transition metals exhibiting practically (when used alone) perpendicular magnetization at temperatures at and above room temperature, and is capable of performing magnetic super-high resolution reproduction. Specifically, by exchange coupling the reproduction magnetic layer 12 which is a perpendicularly magnetized film with the first and second in-plane magnetized layers 2 and 3 that are in-plane magnetized films whose Curie temperatures are lower than those of the reproduction magnetic layer 12 and the recording magnetic layer 5, the reproduction magnetic layer 12 is caused to exhibit in-plane magnetization at temperatures at or below the Curie temperatures of the first and second in-plane magnetized layers 2 and 3. Hence, in the arrangement of the present embodiment, in-plane magnetization masking is formed to cover the reproduction magnetic layer 12 as in embodiment 1, and magnetic super-high resolution reproduction becomes available.

Under these conditions, the reproduction magnetic layer 1 may have a TM-rich composition. The TM moment copied to a target magnetic domain in the reproduction magnetic layer 1 is parallel to the TM moment in the corresponding source magnetic domain in the recording magnetic layer 5 due to the electrostatic coupling between the TM-rich recording magnetic layer 5 and the TM-rich reproduction magnetic layer 12. Therefore, the magneto-optical disk of the present embodiment is capable of performing reproduction with the same polarity as a conventional magneto-optical disk.

EXAMPLE 4

The following description will discuss an application example of the magneto-optical storage medium of the present embodiment to a magneto-optical disk.

Figure 10:
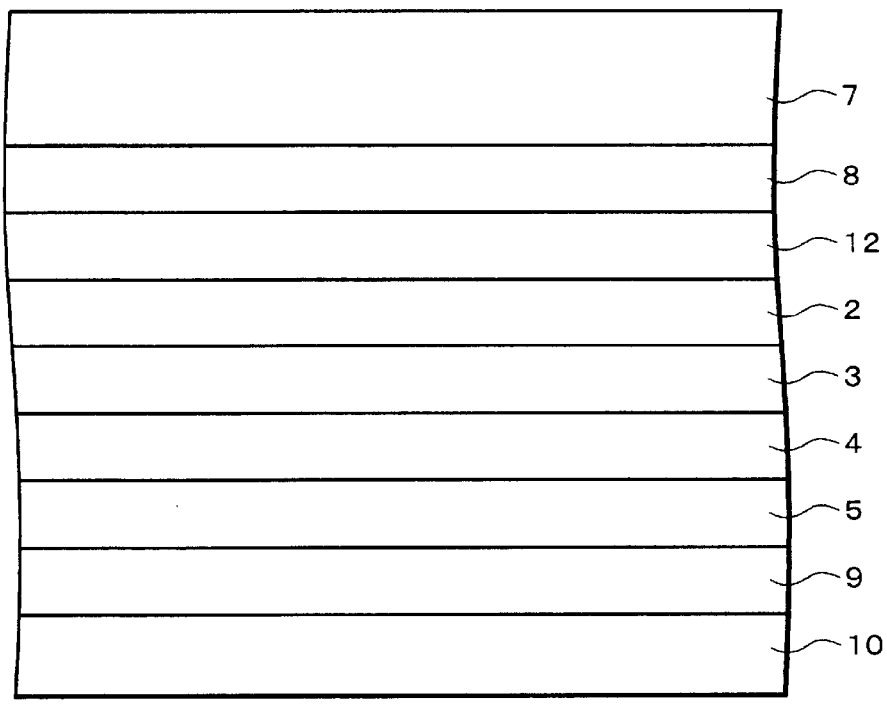
FIG. 10 is an explanatory drawing schematically showing an arrangement of a magneto-optical disk, which is an application example of the magneto-optical storage medium of the foregoing embodiment.

As shown in FIG. 10, the magneto-optical disk of the present example is constituted by a substrate 7 and a sequentially deposited transparent dielectric layer 8, reproduction magnetic layer 12, first in-plane magnetized layer 2, second in-plane magnetized layer 3, non-magnetic intermediate layer 4, recording magnetic layer 5, protection layer 9, and overcoat layer 10.

Now, the following description will discuss a method of manufacturing a magneto-optical disk having this arrangement and recording and reproduction characteristics.

(1) Method of Manufacturing Magneto-optical Disks

The magneto-optical disk of the present example was fabricated by the same method as the method of manufacturing magneto-optical disks discussed in example 1 in the foregoing, by sequentially forming, on the substrate 7, a 60 nm-thick, AlN transparent dielectric layer 8, a 25 nm-thick, $Gd_{0.8}(Fe_{0.80}CO_{0.20})_{0.82}$ reproduction magnetic layer 12 which is a perpendicularly magnetized film exhibiting a TM-rich composition at or above room temperature, a 20 nm-thick, $Gd_{0.12}Fe_{0.88}$ (TM rich) first in-plane magnetized layer 2, a 20 nm-thick, $Gd_{0.46}Fe_{0.54}$ (RE-rich) second in-plane magnetized layer 3, a 2 nm-thick, AlN non-magnetic intermediate layer 4, a 50 nm-thick, $Tb_{0.23}(Fe_{0.80}CO_{0.20})_{0.77}$ recording magnetic layer 5, a 20 nm-thick, AlN protection layer 9, and an overcoat layer 10.

(2) Recording and Reproduction Characteristics

The CNR of the magneto-optical disk of the present example at a mark length of 0.3 $\mu$m was measured in the same manner as in example 1. Results were such that the CNR was 36 dB in example 1 and a close value of 36.5 dB in the present example, meaning that the present example imparted reproduction characteristics that do not significantly differ from those of example 1. An examination on the polarity during reproduction confirmed that the reproduction polarity was opposite to the reproduction polarity of the recording magnetic layer 5 in example 1 but the same with the reproduction polarity of the recording magnetic layer 5 in example 4.

In the present example, similarly to example 1, the first in-plane magnetized layer 2, the second in-plane magnetized layer 3, and the non-magnetic intermediate layer 4 is 60 nm thick or less when combined. If the combined thickness exceeds 60 nm, the reproduction magnetic layer 12 is separated too far apart from the recording magnetic layer 5, and fails to provide sufficiently strong electrostatic coupling with the recording magnetic layer 5, which hampers stable reproduction.

Similar reproduction characteristics are available with the magneto-optical storage medium of the present example even with no non-magnetic intermediate layer 4, as in example 2. A third in-plane magnetized layer 11 may be added to the existent first and second in-plane magnetized layers 2 and 3 as in example 3, so as to increase the inter-surface magnetic walls and achieve higher reproduction resolution.

Embodiment 5

Referring to drawings, the following description will discuss another embodiment in accordance with the present invention. Here, for convenience, members of the present embodiment that have the same arrangement and function as members of embodiment 1, and that are mentioned in embodiment 1 are indicated by the same reference numerals and description thereof is omitted.

Figure 11:
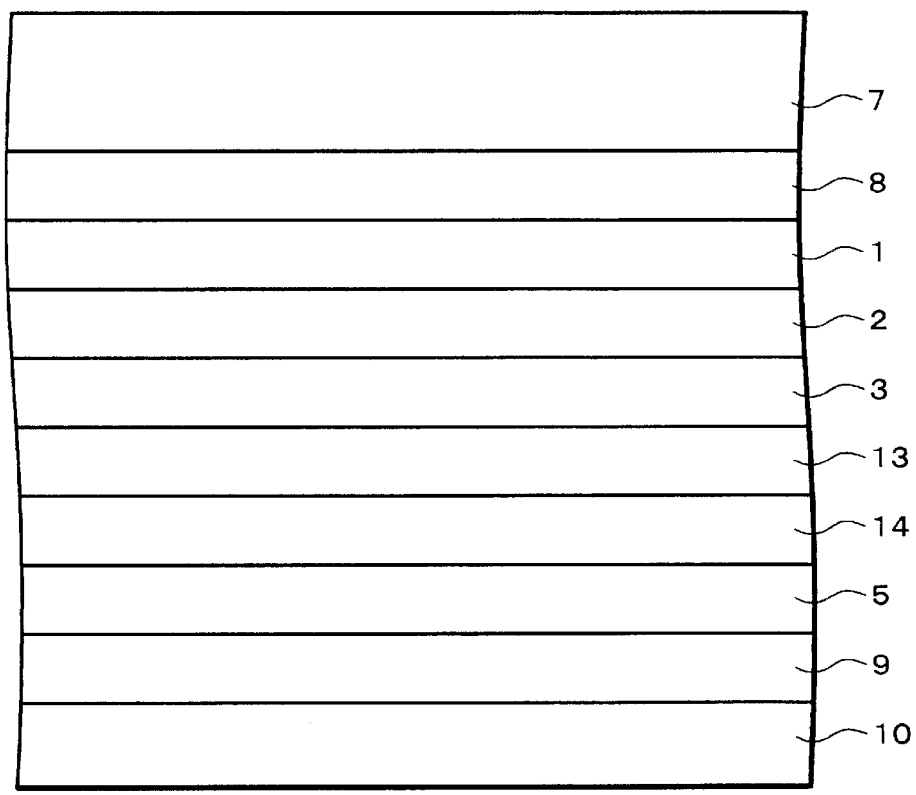
FIG. 11 is an explanatory drawing schematically showing an arrangement of an application example of the magneto-optical storage medium of another embodiment in accordance with the present invention.

As shown in FIG. 11, the magneto-optical storage medium of the present embodiment is constituted by a sequentially deposited reproduction magnetic layer 1, first in-plane magnetized layer 2, second in-plane magnetized layer 3, light-passing dielectric non-magnetic intermediate layer 13, reflection layer 14, and recording magnetic layer 15. In the present embodiment, the light-passing, dielectric non-magnetic intermediate layer 13 replaces and serves as a non-magnetic intermediate layer 4. The reflection layer 14 is additionally provided. The reproduction magnetic layer 1, the first and second in-plane magnetized layers 2 and 3, and the recording magnetic layer 5 of the present embodiment are all magnetic layers identical to those used in embodiment 1. So, magnetic super-high resolution reproduction is available with the present embodiment based substantially on the same principles as in embodiment 1.

The present embodiment includes the same arrangement as in embodiment 1, except that the transparent, dielectric non-magnetic intermediate layer 13 replaces the non-magnetic intermediate layer 4 and the reflection layer 14 is provided, so as to increase the Kerr rotation angle by exploiting interfering effect that occurs in a multi-tiered structure. Further, the reflection layer 14 reflects a light beam 6, completely preventing signal reproduction in the recording magnetic layer 5. This allows only the information copied to the reproduction magnetic layer 1 to be reproduced and thereby improves super-high resolution reproduction characteristics.

The arrangement of the present embodiment, in which the non-magnetic intermediate layer 4 is replaced by a transparent, dielectric non-magnetic intermediate layer 13, and a reflection layer 14 is additionally provided, is applicable not only to embodiment 1, but also to embodiments 3 and 4.

EXAMPLE 5

The following description will discuss an application example of the magneto-optical storage medium of the present embodiment to a magneto-optical disk.

The magneto-optical disk of the present example is constituted by a substrate 7 and a sequentially deposited transparent dielectric layer 8, reproduction magnetic layer 1, first in-plane magnetized layer 2, second in-plane magnetized layer 3, transparent, dielectric non-magnetic intermediate layer 13, reflection layer 14, recording magnetic layer 5, protection layer 9, and overcoat layer 10.

Now, the following description will discuss a method of manufacturing a magneto-optical disk having this arrangement and recording and reproduction characteristics.

(1) Method of Manufacturing Magneto-optical Disks

The magneto-optical disk of the present example was fabricated by the same method as the method of manufacturing magneto-optical disks discussed in example 1 in the foregoing, by sequentially forming, on the substrate 7, a 60 nm-thick, AlN transparent dielectric layer 8, a 25 nm-thick, $Gd_{0.31}(Fe_{0.80}CO_{0.20})_{0.69}$ reproduction magnetic layer 1, a 10 nm-thick, $Gd_{0.12}Fe_{0.88}$ (TM rich) first in-plane magnetized layer 2, a 10 nm-thick, $Gd_{0.46}Fe_{0.54}$ (RE-rich) second in-plane magnetized layer 3, a 10 nm-thick, AlN non-magnetic intermediate layer 13 through which a light beam 6 passes, a 10 nm-thick, $Al_{0.8}Ti_{0.2}$ reflection layer 14, a 50 nm-thick, $Tb_{0.23}(Fe_{0.80}CO_{0.20})_{0.77}$ recording magnetic layer 5, a 20 nm-thick, AlN protection layer 9, and an overcoat layer 10.

(2) Recording and Reproduction Characteristics

The CNR of the magneto-optical disk of the present example at a mark length of 0.3 μm was measured in the same manner as in example 1. Results were such that the CNR was 36 dB in example 1 and 38 dB in the present example, meaning that the present example imparted better super-high resolution reproduction characteristics than example 1.

In the arrangement of the present example, AlN, SiN, AlSiN, $Ta_2O_3$ and other non-magnetic dielectrics may be used to form the transparent, dielectric non-magnetic intermediate layer 13.

As to the reflection layer 14, Al, Ti, Ta, Pt, Au, Cu and other non-magnetic metals and alloys of these metals may be used.

To obtain satisfactory interfering effect, preferably, the transparent dielectric layer 8 is 40 nm to 100 nm thick as it is in example 1, and the reproduction magnetic layer 1, the first in-plane magnetized layer 2, and the second in-plane magnetized layer 3 are 50 nm thick or less when combined. If the combined thickness exceeds 50 nm, the reproduction magnetic layer 1, the first in-plane magnetized layer 2, and the second in-plane magnetized layer 3 blocks too much of the incident light, presenting difficulties in increasing the Kerr rotation angle through the interfering effect.

Further, in order to effectively increase the Kerr rotation angle, the non-magnetic intermediate layer 13 fabricated from a transparent dielectric preferably is 5 nm to 30 nm thick.

Besides, in, order for the reflection layer 14 to completely prevent signal reproduction in the recording magnetic layer 5 and thereby allow only the information copied to the reproduction magnetic layer 1 to be reproduced, the reflection layer 14 is required to be at least 5 nm.

The first in-plane magnetized layer 2, the second in-plane magnetized layer 3, the transparent, dielectric non-magnetic intermediate layer 13, and the reflection layer 14 are preferably 60 nm thick or less when combined. If the combined thickness exceeds 60 nm, the reproduction magnetic layer 1 is separated too far apart from the recording magnetic layer 5, and fails to establish sufficiently strong electrostatic coupling with the recording magnetic layer 5, which hampers stable reproduction.

In the magneto-optical storage medium of the present example, a third in-plane magnetized layer 11 may be added to the existent first and second in-plane magnetized layers 2 and 3 as in example 3, so as to increase the inter-surface magnetic walls and achieve higher reproduction resolution.

As detailed in embodiments 1 to 5, the magneto-optical storage media in accordance with the present invention each include at least two in-plane magnetized layers adjacent to a reproduction magnetic layer, wherein the in-plane magnetized layers have opposite magnetic polarities between every adjacent pair of the in-plane magnetized layers. The arrangement enhances in-plane magnetization masking and improves reproduction resolution. The invention may be varied in many ways, and such variations are not to be regarded as a departure from the spirit and scope of the invention.

In the arrangement of the magneto-optical storage media in accordance with the present invention, preferably, the reproduction magnetic layer is spaced apart from a recording magnetic layer by a distance of not more than 60 nm When the reproduction magnetic layer is spaced apart from the recording magnetic layer by a distance in such a range, good electrostatic coupling force acts between the two layers, and enables stable reproduction. Besides, in order to achieve good in-plane magnetization masking, preferably, each of the in-plane magnetized layers is at least 3 nm thick. Taking into consideration that there are provided at least two in-plane magnetized layers between the reproduction magnetic layer and the recording magnetic layer, the reproduction magnetic layer is preferably spaced apart from the recording magnetic layer by a distance not less than 6 nm and not more than 60 nm.

As detailed in the foregoing, a first magneto-optical storage medium in accordance with the present invention is characterized in that it includes at least:
  a reproduction magnetic layer exhibiting in-plane magnetization at room temperature and changing to perpendicular magnetization at a critical temperature or higher;
  a plurality of in-plane magnetized layers with Curie temperatures in a proximity of the critical temperature; and
  a recording magnetic layer fabricated from a perpendicularly magnetized film,
  the reproduction magnetic layer, the plurality of in-plane magnetized layers, and the recording magnetic layer being deposited in this sequence,
  wherein the plurality of in-plane magnetized layers exhibit opposite magnetic polarities between every adjacent pair of the plurality of in-plane magnetized layers, and
  the reproduction magnetic layer is exchange-coupled with the plurality of in-plane magnetized layers at least at room temperature.

With the arrangement, the exchange coupling between the plurality of in-plane magnetized layers with opposite magnetic polarities forms an inter-surface magnetic wall; this greatly enhances ability to retain the in-plane magnetization against magnetic flux leakage. In this manner, the arrangement retains the in-plane magnetization of the reproduction magnetic layer and reinforces in-plane magnetization masking, resulting in improvement in reproduction resolution.

As in the foregoing, the present invention successfully improves masking effect of the in-plane magnetized layers and also reproduces signals with sufficient quality from recording bits of small diameters and intervals, i.e., improves reproduction resolution in magnetic super-high resolution reproduction.

A second magneto-optical storage medium in accordance with the present invention, including all the features of the first magneto-optical storage medium, is characterized in that
  the reproduction magnetic layer has an opposite polarity to that of one of the plurality of in-plane magnetized layers that is closest to the reproduction magnetic layer.

With the arrangement, the polarities are specified to be opposite between the reproduction magnetic layer and one of the plurality of in-plane magnetized layers that is closest to the reproduction magnetic layer; this greatly enhances ability to retain the in-plane magnetization between the reproduction magnetic layer and that one of the plurality of in-plane magnetized layers closest thereto, similarly to the in-plane magnetization between the adjacent pairs of the plurality of in-plane magnetized layer, at a relatively low temperature range.

A third magneto-optical storage medium in accordance with the present invention is characterized in that it includes at least:
  a reproduction magnetic layer exhibiting perpendicular magnetization from room temperature to a Curie temperature when used alone;
  a plurality of in-plane magnetized layers with Curie temperatures lower than the Curie temperature of the reproduction magnetic layer; and
  a recording magnetic layer fabricated from a perpendicularly magnetized film,
  the reproduction magnetic layer, the plurality of in-plane magnetized layers, and the recording magnetic layer being deposited in this sequence,
  wherein the plurality of in-plane magnetized layers exhibit opposite magnetic polarities between every adjacent pair of the plurality of in-plane magnetized layers, and
  the reproduction magnetic layer is exchange-coupled with the plurality of in-plane magnetized layers and thereby exhibits in-plane magnetization at least at room temperature.

With the arrangement, the exchange coupling of the reproduction magnetic layer fabricated from a perpendicularly Magnetized film with the plurality of in-plane magnetized layers with Curie temperatures lower than the Curie temperature of the reproduction magnetic layer aligns the magnetization of the reproduction magnetic layer in parallel to the in-plane direction and thus causes the reproduction magnetic layer to exhibit in-plane magnetization at temperatures not higher than the Curie temperatures of the plurality of in-plane magnetized layers. Consequently, in-plane magnetization masking is provided to the reproduction magnetic layer similarly to the above arrangement, enabling magnetic super-high resolution reproduction.

A fourth magneto-optical storage medium in accordance with the present invention, including all the features of any of the first to third magneto-optical storage media, is characterized in that
  it further includes a non-magnetic intermediate layer between the plurality of in-plane magnetized layers and the recording magnetic layer.

With the arrangement, the recording magnetic layer, the reproduction magnetic layer, and the plurality of in-plane magnetized layers are electrostatically coupled in a stable manner.

A fifth magneto-optical storage medium in accordance with the present invention, including all the features of the fourth magneto-optical storage medium, is characterized in that
  it further includes a reflection layer between the non-magnetic intermediate layer and the recording magnetic layer.

With the arrangement, the reflection layer, as well as the non-magnetic intermediate layer, is provided; this increase the Kerr rotation angle by exploiting interfering effect that occurs in a multi-tiered structure. Further, the reflection layer reflects a light beam, completely preventing signal reproduction in the recording magnetic layer. This allows only the information copied to the reproduction magnetic layer to be reproduced and thereby improves super-high resolution reproduction characteristics.

A sixth magneto-optical storage medium in accordance with the present invention, including all the features of any of the first to fifth magneto-optical storage media, is characterized in that
  each of the plurality of in-plane magnetized layers is at least 3 nm thick, and
  the reproduction magnetic layer is separated from the recording magnetic layer by a distance of 60 nm or less.

In the arrangement, each of the plurality of in-plane magnetized layers is at least 3 nm thick; this provides good in-plane magnetization masking. In addition, the reproduction magnetic layer is separated from the recording magnetic layer by a distance of 60 nm or less; the recording magnetic layer and the reproduction magnetic layer are electrostatically coupled in a satisfactory manner, enabling stable reproduction. However, taking into consideration that there are provided at least two in-plane magnetized layers between the reproduction magnetic layer and the recording magnetic layer, by separating the reproduction magnetic layer from the recording magnetic layer by a distance greater than 6 nm and below 60 nm, the recording magnetic layer and the reproduction magnetic layer are electrostatically coupled in a satisfactory manner, enabling stable reproduction.

A first method of reproducing information in accordance with the present invention is characterized in that information is reproduced from the first magneto-optical storage medium by the method, and the method includes a step of heating the reproduction magnetic layer and the plurality of in-plane magnetized layers to or exceeding the proximity of the critical temperature.

A second method of reproducing information in accordance with the present invention is characterized in that information is reproduced from the third magneto-optical storage medium by the method, and the method includes a step of heating the reproduction magnetic layer and the plurality of in-plane magnetized layers to or exceeding the Curie temperatures of the plurality of in-plane magnetized layers.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magneto-optical storage medium, comprising:
    a reproduction magnetic layer exhibiting in-plane magnetization at room temperature and changing to perpendicular magnetization at a critical temperature or higher;
    a plurality of in-plane magnetized layers with Curie temperatures in a proximity of the critical temperature and opposite magnetic polarities between every adjacent pair of the plurality of in-plane magnetized layers; and
    a recording magnetic layer fabricated from a perpendicularly Magnetized film,
    the reproduction magnetic layer, the plurality of in-plane magnetized layers, and the recording magnetic layer being sequentially deposited,
    wherein the reproduction magnetic layer is exchange-coupled with the plurality of in-plane magnetized layers at least at room temperature.

2. The magneto-optical storage medium as set forth in claim 1, wherein
    each of the plurality of in-plane magnetized layers is at least 3 nm thick.

3. The magneto-optical storage medium as set forth in claim 1, wherein
    the reproduction magnetic layer has an opposite polarity to that of one of the plurality of in-plane magnetized layers that is closest to the reproduction magnetic layer.

4. The magneto-optical storage medium as set forth in claim 1, wherein
    the plurality of in-plane magnetized layers are substantially equally thick.

5. The magneto-optical storage medium as set forth in claim 1, wherein
    the plurality of in-plane magnetized layers are 60 nm thick or less.

6. The magneto-optical storage medium as set forth in claim 1, wherein
    the plurality of in-plane magnetized layers are constituted by a first in-plane magnetized layer and a second in-plane magnetized layer.

7. The magneto-optical storage medium as set forth in claim 1, wherein
    the critical temperature of the reproduction magnetic layer is not lower than 100° C. and not higher than 200° C.

8. The magneto-optical storage medium as set forth in claim 1, wherein
    the reproduction magnetic layer is not thinner than 10 nm and not thicker than 50 nm.

9. The magneto-optical storage medium as set forth in claim 1, wherein
    the first in-plane magnetized layer has the Curie temperature within ±30° C. of the critical temperature.

10. The magneto-optical storage medium as set forth in claim 6, wherein
    the second in-plane magnetized layer is 20 nm thick or more.

11. The magneto-optical storage medium as set forth in claim 6, wherein
    the reproduction magnetic layer is RE-rich in a proximity of a reproduction temperature,
    the first in-plane magnetized layer is TM-rich, and
    the second in-plane magnetized layer is RE-rich.

12. The magneto-optical storage medium as set forth in claim 1, wherein
    the plurality of in-plane magnetized layers are constituted by a first in-plane magnetized layer, a second in-plane magnetized layer having a different magnetic polarity from that of the first in-plane magnetized layer, and a third in-plane magnetized layer having a different magnetic polarity from that of the second in-plane magnetized layer, the first, second, and third in-plane magnetized layers being sequentially deposited.

13. A magneto-optical storage medium, comprising:
    a reproduction magnetic layer exhibiting perpendicular magnetization from room temperature to a Curie temperature when used alone;
    a plurality of in-plane magnetized layers with Curie temperatures lower than the Curie temperature of the reproduction magnetic layer and opposite magnetic polarities between every adjacent pair of the plurality of in-plane magnetized layers; and
    a recording magnetic layer fabricated from a perpendicularly magnetized film,
    the reproduction magnetic layer, the plurality of in-plane magnetized layers, and the recording magnetic layer being sequentially deposited,
    wherein the reproduction magnetic layer is exchange-coupled with the plurality of in-plane magnetized layers and thereby exhibits in-plane magnetization at least at room temperature.

14. The magneto-optical storage medium as set forth in claim 1, further comprising a non-magnetic intermediate layer between the plurality of in-plane magnetized layers and the recording magnetic layer.

15. The magneto-optical storage medium as set forth in claim 14, wherein
the plurality of in-plane magnetized layers and the non-magnetic intermediate layer are 60 nm thick or less when combined.

16. The magneto-optical storage medium as set forth in claim 14, wherein
the non-magnetic intermediate layer is not thinner than 0.5 nm and not thicker than 40 nm.

17. The magneto-optical storage medium as set forth in claim 1, wherein
the recording magnetic layer is not thinner than 20 nm and not thicker than 80 nm.

18. The magneto-optical storage medium as set forth in claim 1, further comprising a protection layer for preventing oxidation of an alloy of rare earth and transition metals.

19. The magneto-optical storage medium as set forth in claim 14, further comprising a reflection layer between the non-magnetic intermediate layer and the recording magnetic layer.

20. The magneto-optical storage medium as set forth in claim 19, wherein
the non-magnetic intermediate layer is composed of a transparent dielectric.

21. The magneto-optical storage medium as set forth in claim 20, wherein
the non-magnetic intermediate layer composed of a transparent dielectric is not thinner than 5 nm and not thicker than 30 nm.

22. The magneto-optical storage medium as set forth in claim 19, wherein
the reflection layer is at least 5 nm thick.

23. The magneto-optical storage medium as set forth in claim 1, wherein
each of the plurality of in-plane magnetized layers is at least 3 nm thick, and
the reproduction magnetic layer is separated from the recording magnetic layer by a distance of 60 nm or less.

24. A method of reproducing information on a magneto-optical storage medium,
said magneto-optical storage medium including:
a reproduction magnetic layer exhibiting in-plane magnetization at room temperature and changing to perpendicular magnetization at a critical temperature or higher;
a plurality of in-plane magnetized layers with Curie temperatures in a proximity of the critical temperature and opposite magnetic polarities between every adjacent pair of the plurality of in-plane magnetized layers; and
a recording magnetic layer fabricated from a perpendicularly magnetized film,
the reproduction magnetic layer, the plurality of in-plane magnetized layers, and the recording magnetic layer being sequentially deposited,
wherein the reproduction magnetic layer is exchange-coupled with the plurality of in-plane magnetized layers at least at room temperature,
said method comprising a step of heating the reproduction magnetic layer and the plurality of in-plane magnetized layers to or exceeding the proximity of the critical temperature.

25. A method of reproducing information on a magneto-optical storage medium,
said magneto-optical storage medium including:
a reproduction magnetic layer exhibiting perpendicular magnetization from room temperature to a Curie temperature when used alone;
a plurality of in-plane magnetized layers with Curie temperatures lower than the Curie temperature of the reproduction magnetic layer and opposite magnetic polarities between every adjacent pair of the plurality of in-plane magnetized layers; and
a recording magnetic layer fabricated from a perpendicularly magnetized film,
the reproduction magnetic layer, the plurality of in-plane magnetized layers, and the recording magnetic layer being sequentially deposited,
wherein the reproduction magnetic layer is exchange-coupled with the plurality of in-plane magnetized layers and thereby exhibits in-plane magnetization at least at room temperature,
said method comprising a step of heating the reproduction magnetic layer and the plurality of in-plane magnetized layers to or exceeding the Curie temperatures of the plurality of in-plane magnetized layers.

* * * * *